United States Patent
van de Klundert

[11] 3,805,687
[45] Apr. 23, 1974

[54] MEANS FOR CONTINUOUS AND AUTOMATED FRYING OF CUT OR SLICED PRODUCTS ON A FRYING SURFACE

[75] Inventor: Cornelis J. A. van de Klundert, Wageningen, Netherlands

[73] Assignee: Instituut voor Bewaring en Verwerking van Landbouwprodukten, Wageningen, Netherlands

[22] Filed: Dec. 28, 1971

[21] Appl. No.: 213,093

[30] Foreign Application Priority Data
Dec. 31, 1970 Netherlands.................. 7019102

[52] U.S. Cl.................. 99/352, 99/423, 99/443 R
[51] Int. Cl............................................. A47j 37/00
[58] Field of Search............ 99/1, 100 P, 422, 423, 99/424, 443 R, 443 C, 352, 373, 457, 348; 259/2; 198/111, 185

[56] References Cited
UNITED STATES PATENTS

| | | |
|---|---|---|
| 2,529,253 | 11/1950 | Hoffman et al................ 99/443 C |
| 3,435,755 | 4/1969 | Lohr et al........................ 99/423 X |
| 3,593,652 | 7/1971 | Lostanien ......................... 99/423 |

Primary Examiner—Billy J. Wilhite
Attorney, Agent, or Firm—Arnold Robinson; William D. Lucas; Frank J. DeRosa

[57] ABSTRACT

This invention relates to a method and apparatus for the continuous and automated frying of a cut or sliced product, such as potatoes, on a heated frying surface. The product is supplied with a measured amount of oil or fat at one end of a frying surface, removed from the surface periodically, mixed so that other cuttings and sides of cuttings may come into contact with the frying surface, conveyed closer to the opposite end of the frying surface where it will eventually be discharged, and replaced back on the frying surface to continue frying at a point closer to the discharge end of the frying surface.

11 Claims, 5 Drawing Figures

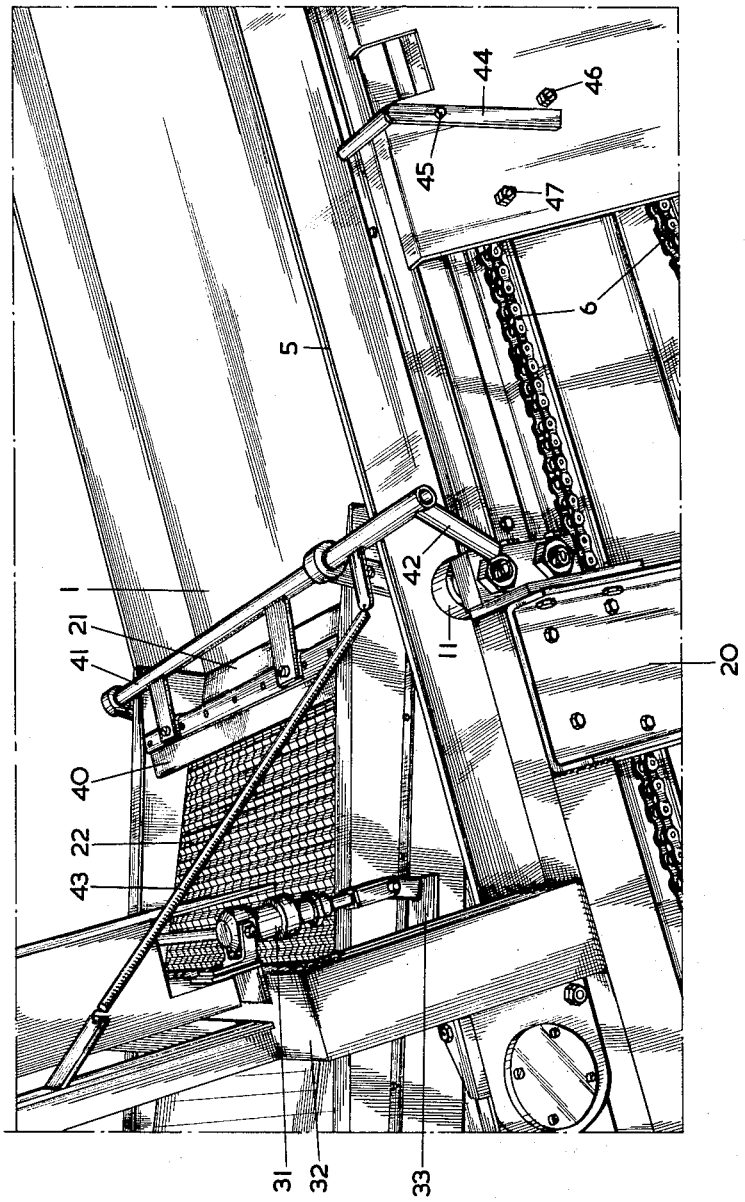

MEANS FOR CONTINUOUS AND AUTOMATED FRYING OF CUT OR SLICED PRODUCTS ON A FRYING SURFACE

SUMMARY

The present invention relates to the frying of a product such as potato cuttings with oil or fat on a heated frying surface. The invention is especially suited to the frying of potato cuttings described in U.S. Pat. application No. 881,591 now abandoned.

It is well known in the art that frying on a heated frying surface produces a product which differs in taste and appearance from a product which is deep fried. The deep frying process can be carried out in one continuous operation, since the frying oil can simultaneously be used as a conveyor means to move the product through the cooker by circulation of the oil through the cooker.

However, when frying on a heated frying surface, no such conveyor means is present. In addition, care must be taken that the product to be fried is periodically stirred so that there will be a constant change in the portion of the product coming into contact with the hot frying surface. On the other hand, it is not necessary to separate the oil or fat from product after the frying process since the initial product contains the exact quantity of oil or fat, (about 10 percent), used or consumed during the frying process.

Therefore, the primary object of the invention is to provide a continuous and automated frying apparatus in which products in the form of granules or slices, such as potato cuttings, may be fried on a frying surface.

The apparatus used in the process provides for the periodic removal of the product from the frying surface and its replacement thereon in order to place different portions of the cut product, or different cuttings, in contact with the frying surface. After each removal of the product from the frying surface, the product is displaced a predetermined distance in the direction of the discharge end of the frying surface before it is replaced on the frying surface. Thus the product is continually removed from the frying surface, mixed, conveyed and replaced back on the frying surface at a point closer to the discharge end of the frying surface. In this way, different sides of the product or different cuttings come into contact with the frying surface as the product is moved from the supply end to the discharge end of the frying surface.

The apparatus comprises an oblong frying body with a supply end for the unfried product and a discharge end for the fried product, and a vehicle which is adapted to be moved over the frying body at least from the discharge end to the supply end. The vehicle is provided with means to remove the product to be fried from the frying surface, to convey the product in the direction of the discharge end and to drop the product back on the frying surface.

A frying apparatus according to the present invention is easy to keep clean, which is an important advantage in the food industry.

The aforementioned means preferably consist of a scraper turned towards the supply end, and a conveyor adjoining the scraper.

In this embodiment, the scraper, during the displacement of the vehicle in the direction of the supply end of the frying body, detaches the product to be fried from the frying surface and passes it on to the adjoining conveyor, which deposits the product to be fried on the frying surface somewhat nearer to the discharge end. The vehicle provided with the scraper and conveyor means serves to detach the product to be fried from the frying surface periodically, to mix it so that other cuttings and sides of cuttings come into contact with the frying surface, and to convey the product in the direction of the discharge end.

The vehicle may be mounted on tracks and can be pulled back and forth along the cooker by pulling members such as chains, whereby the scaper is adapted to be tilted between a position engaging the frying body and a free position. It will be apparent that during the displacement of the vehicle in the direction of the supply end of the frying body, the scraper should engage the frying body, while during the displacement of the vehicle in the opposite direction the scraper should be out of engagement with the frying surface.

There are several feasible conveyor means for use with the vehicle for dropping the product to be fried in the direction of the discharge end of the frying body. In order to simply control the velocity with which the product is thrown off, it is preferable, however, to have the conveyor means consist of a belt conveyor stretched about rolls, preferably a grate belt conveyor, the upper part of which is adapted to be displaced in the direction of the discharge end of the frying body.

The aforementioned tilting motion of the scraper can simply be realized if the scraper is fixed to the framework of the belt conveyor and can be tilted by means of at least one single pneumatically operated or hydraulically operated piston cylinder assembly about the conveyor roll axis turned away from the scraper.

In order to keep the apparatus as simple as possible, it is preferable that the pulling members for the vehicle (the drive chains) be movable in the same direction under all conditions. For this purpose a slide block is included in the connection between the pulling members and the vehicle, and is mounted for sliding motion in a vertical guide passage of the vehicle. The vehicle can then be alternately driven in opposite directions by the upper part and by the lower part of the pulling members.

There are many ways to heat the frying surface. However, for increased safety the frying body may consist of a box into which steam can be passed to heat the frying surface.

In order to prevent that product which has not been fried yet from sticking to the scraper and being carried to the discharge end of the frying body, there are means present to wipe and clean the scraper at the starting point of the traveling part of the vehicle.

The cleaning means preferably consist of a tiltable wiper which can be made to tilt by an actuating member, which is positioned in the proximity of the supply end of the frying body.

DESCRIPTION OF THE DRAWINGS

The invention will now be explained in more detail with reference to the drawings showing a preferred embodiment of the invention.

FIG. 5 shows a plan view of the scraper portion of the moving and transporting vehicle.

Referring now to FIG. 1, the apparatus comprises an oblong frying body 1 formed by a hollow box which may be made of cast iron. The frying body is provided with side walls 5. Steam is passed into the interior of the box, which heats the frying surface (top surface of the box) to the desired temperature. The frying body is mounted in an inclined position directed downwardly from the supply end (at the left in FIG. 1) to the discharge end by means of a supporting element 2. Such an inclined position aids in the conveyance of the product to be fried, but is not always required. The product to be fried is supplied by conveyor 3 where fat or oil is also supplied in predetermined quantities such that after the frying process it is not necessary to separate the product from the fat or the oil.

Figure 4:
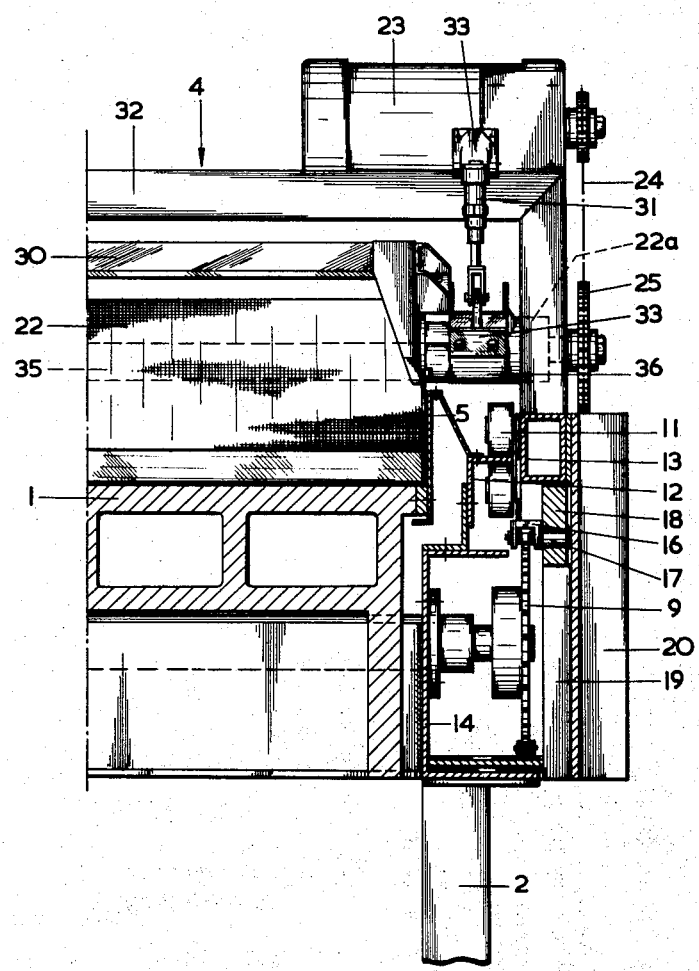
FIG. 4 shows a sectional view along the line IV—IV in FIG. 3.

Over the top surface of the frying body 1 a mixing and transporting vehicle 4 can be pulled back and forth by means of two endless chains 6. The sprocket wheels 7 are driven by the motor 8. Provided in the proximity of the discharge end of the frying body 1 are reversing wheels 9 comprising straining means for the chains 6. The vehicle 4 is mobile on rails 12 by mean of four pairs of wheels 11. The wheels are supported in the frame-structure 13 of the vehicle, which consists of tubular sections as shown in FIG. 4. The rails 12 are mounted on channel-shaped profiles 14 which extend on either side of the frying body 1. The channel-shaped profiles also serves as the support for the bearings of the sprocket wheels 7 and 9.

Figure 2:
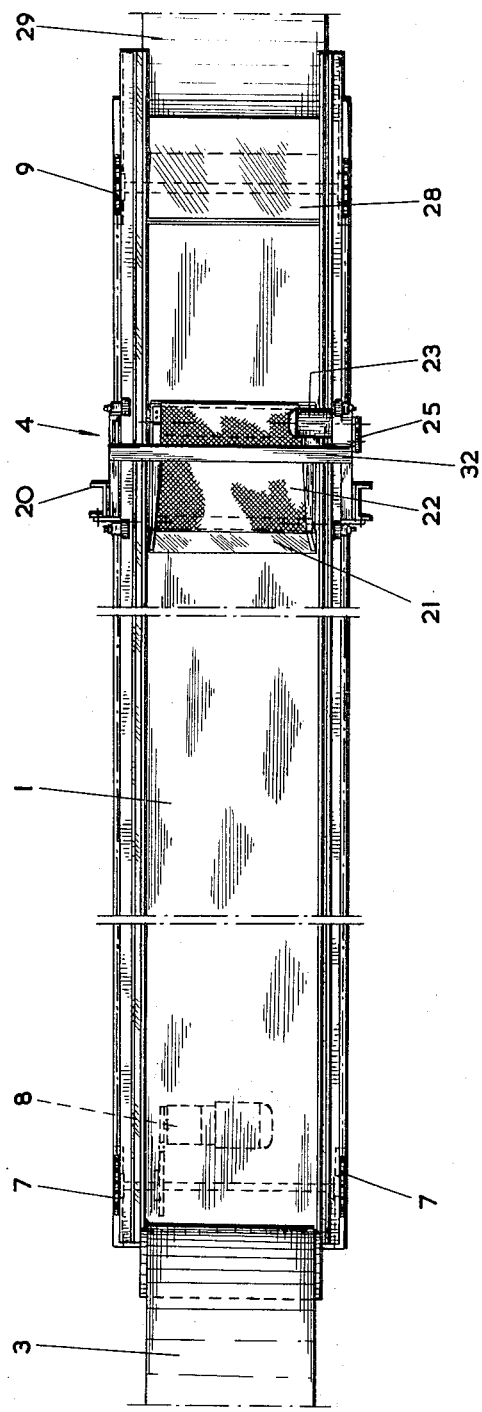
FIG. 2 shows a top elevational view in which for the sake of clarity some details of the vehicle adapted to be moved over the frying body are not shown in the drawing.

The vehicle 4 is pulled back and forth over the frying body by chain 6 which is pivotally attached to a forked member 16. The forked member 16 is rotatably mounted with a projecting pin 17 in a slide block 18 which is mounted for an upward and downward sliding motion within a guide means 19. The guide means 19 may consist of two small blocks, for instance, which are attached to the channel-shaped profiles, shown in FIGS. 2 and 3, enclosing a dovetail opening in which the dovetail slide block 18 is mounted for a sliding motion.

Figure 3:
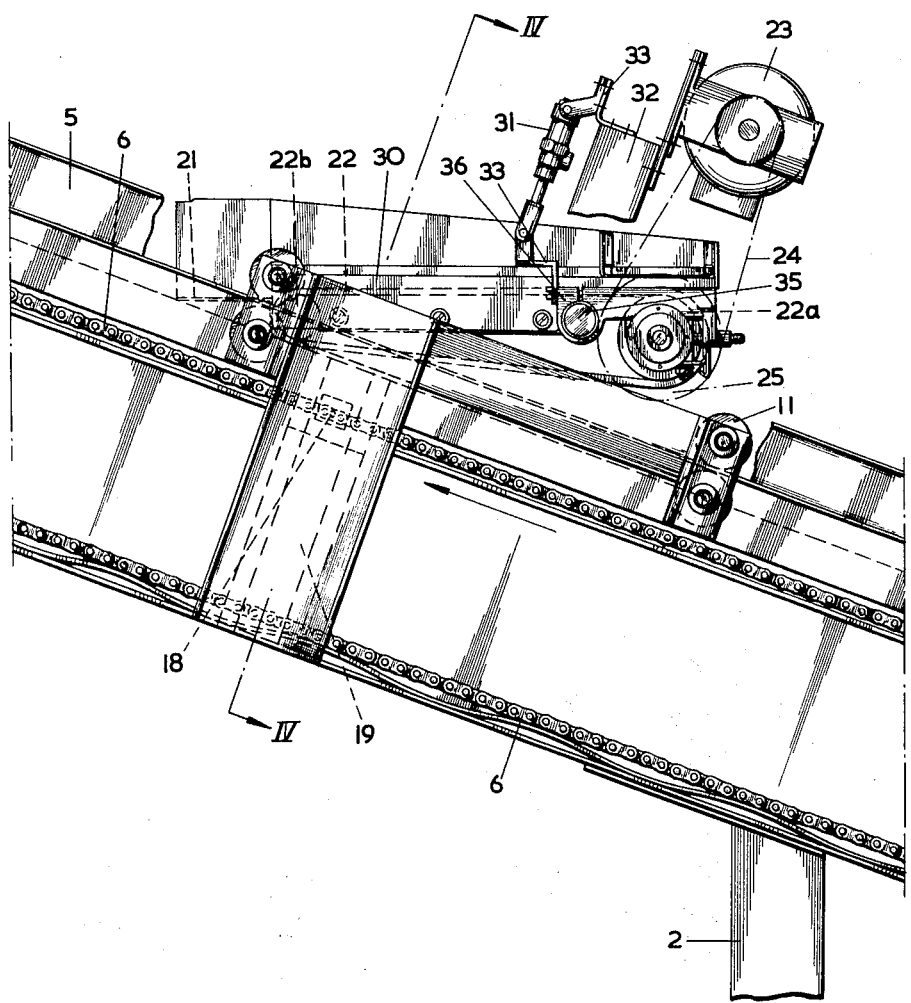
FIG. 3 shows a side elevational view on an enlarged scale of the lorry adapted to be moved over the frying body.

Assuming that the chains 6 move in the direction of the arrow in FIG. 3 when the chain links, to which the forked members 16 are attached, are passed over the sprocket wheels 7, the slide blocks 18 will move downwardly in the guide means 19. On the other hand, if the same links are passed over the reversing wheel 9, the slide blocks 18 will move upwardly in the guide means 19. Thus the vehicle 4 is alternately driven by the upper and lower part of the drive chain 6 and is pulled back and forth over the frying body.

Referring now to FIG. 3, the vehicle 4 comprises successively a scraper 21, a grate belt conveyor 22 with a motor-driven roll 22a and an end roll 22b. The roll 22a is driven by the motor 22 through a chain 24 and a sprocket wheel 25.

When the vehicle 4 is moved in the direction of the supply end of the frying body, the scraper 21 is resting on the top surface of the frying body 1; as a result of this the product to be fried is detached from the frying surface 1, is taken up therefrom, and is subsequently disposed on the grate belt conveyor 22, which moves at relatively high speed, throwing the product to be fried in the direction of the discharge end of the frying body. During this process, the product to be fried is periodically conveyed by the vehicle 4 in the direction of the discharge end of the frying body, whereby different cuttings and different sides of cuttings of the product to be fried come into contact with the frying surface.

When the product has reached the discharge end of the frying body, it is removed by the grate belt conveyor 22 and is passed on to a discharge conveyor means 29 through a chute 28.

When the vehicle 4 is moved in the direction of the discharge end, the scraper 21 must be lifted from the frying body 1. To this end the scraper is secured to the frame 30 of the grate belt conveyor 22, with the frame being adapted to tilt about the pin of the driven roll 22b of the grate belt 22. The tilting motion is actuated by two pneumatically operated piston cylinder assemblies 31. The top of each of these cylinders is pivotally attached to a portal structure 32 which also serves to support the motor reductor 23. The underside of each of the piston rods of the assemblies 31 is pivotally attached to an L-piece 33 forming part of the frame 30.

Figure 1:
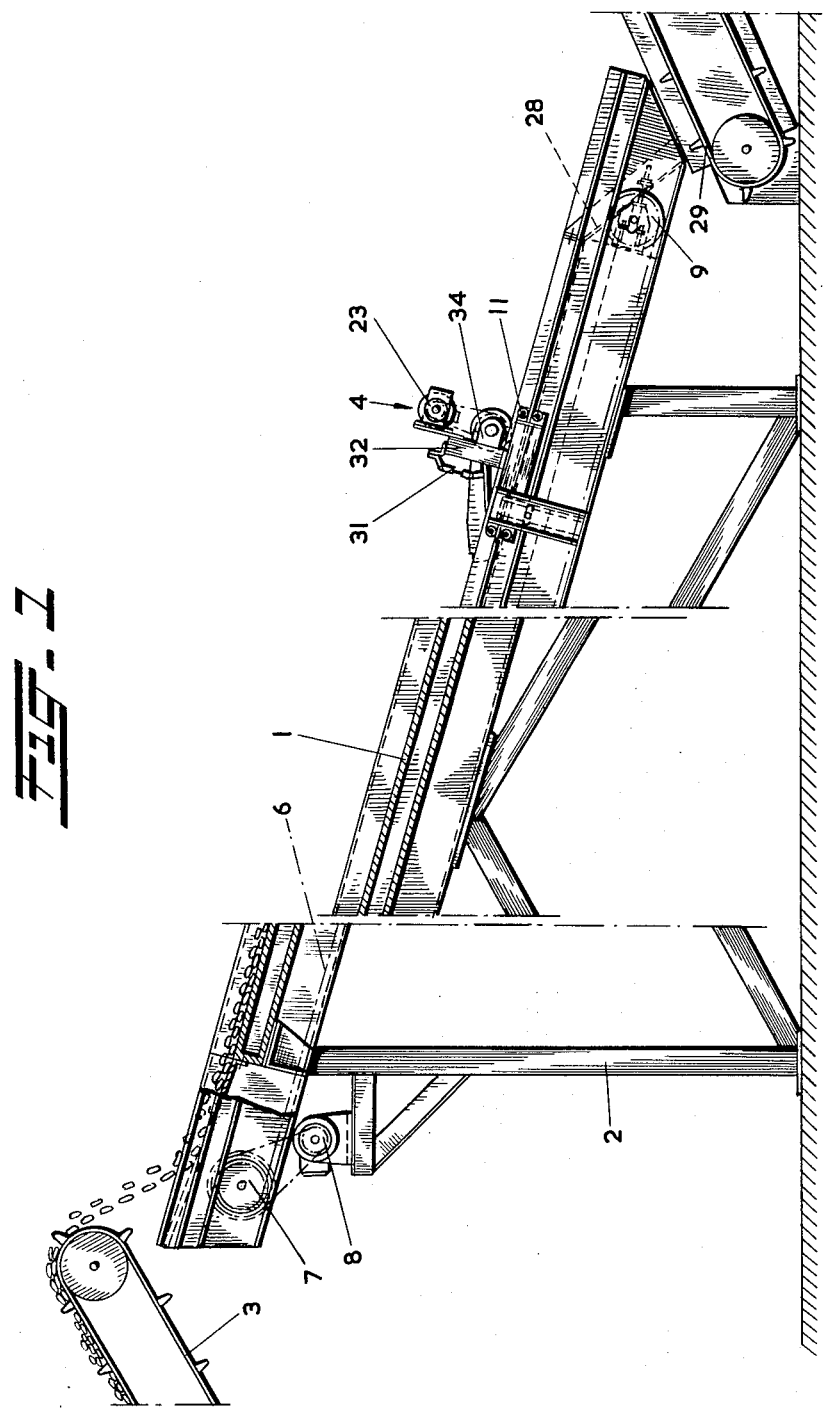
FIG. 1 shows a side elevational view, partly in section, of the frying body according to the invention.

It will be apparent that by retracting the pistons of the piston cylinder assemblies 31, the frame 30 (with side plating) of the grate belt conveyor 22 is hinged upwardly about the pin of the roll 22b of the grate belt conveyor 22. This pin 22b is supported in lugs 34 which are fixed to the portal structure 32 by welding (as shown in FIG. 1). The scraper of 21 is thus out of engagement with the frying body 1.

The pneumatically operated piston cylinder assemblies 31 are controlled through micro switches or photo-cells which are operated by the vehicle 4 when it approaches the supply and discharge ends of the frying body.

The frame 30 of the grate belt 32 comprises two halves which are pivotally mounted with respect to one another about the pivot 25, but are held fixed by clamps 36, secured by bolts. Accordingly, when the bolts on clamps 36 are relieved, the frame 30 can be folded together which is necessary when applying or replacing the grate belt. L-pieces 33, to which the underside of the piston rods is attached, are connected to the clamps 36.

The product not being fried must be prevented from being carried by the scraper to the discharge end of the frying body. For this purpose the vehicle 4 is provided with a wiper 40 shown in FIG. 5, which cleans the scraper by wiping it when the scraper is lifted from the frying body and has started its operative stroke towards the discharge end.

The wiper 40 is attached to a rotatably mounted tilting shaft 41, one end of which is provided with a radial extension 42. The tilting shaft 41 is loaded by the tension spring in the direction of the rest position shown in FIG. 5.

Provided next to the frying body in the proximity of the discharge end thereof, is an L-shaped control member 44, which can tilt about a pivot 45 and can engage the extension 42 of the wiper shaft 41. The pivotal movement of the control member is restricted by two cams 46 and 47.

When the vehicle is moved upwardly towards the discharged end of the frying body, i.e. when the scraper 21 engages the frying body, the extension 42 of the wiper shaft 41 engages the control member 44 causing the latter to hinge from its shaft 45 to the cam 47 without the wiper 40 being operated. After having passed the extension 42, the control member drops back into the position shown in FIG. 5; to this end the center of gravity of the control member 44 lies under the shaft 45.

When the vehicle 4 performs its return downward movement, (in FIG. 5 to the left) the extension 42 also engages the L-shaped control member 44; in this instance, however, the control member is restrained by the cam 46. The result of this is that the wiper shaft 40 is hinged against the action of the tension spring 43, causing the wiper to be moved across the scraper 21 and the latter to be wiped clean. Once the extension has passed the control member 44, the wiper is pulled back into the position shown in the drawing.

The disclosed method and apparatus provide a fried product in an automatic and continuous way, which will compare favorably with a product fried and periodically stirred in a frying-pan, or a deep fried product.

It will be clear that various modifications are conceivable without departing from the spirit or the scope of the claims following hereinafter. It is more specifically conceivable to use a different type of heating than steam heating and a different type of conveyor for the vehicle adapted to move over the frying body. Additionally, the product to be fried is not limited to cut or sliced products such as potatoes, but may include other products which may be cooked by the disclosed method and apparatus.

What is claimed is:

1. A frying apparatus for frying a product with oil or fat, comprising:
   a. a stationary frying body having a frying surface, a supply end and a discharge end; and
   b. first means operative to be displaced over said frying body from said discharge end to said supply end and operative to take up said product to be fried from said frying surface, to convey said product and to drop said product back on said surface in the direction of said discharge end of said frying body.

2. The frying apparatus of claim 1 in which said apparatus further comprises means for displacing said first means back and forth along said frying body, said displacing means comprising pulling members.

3. The frying apparatus of claim 1 wherein said first means comprises a scraper turned towards said supply end of said frying body to take up said product.

4. The frying apparatus of claim 3 wherein said scraper is adapted to be tilted between a first position in which it is in engagement with the frying body and a second position in which it is out of engagement.

5. The frying apparatus of claim 1 wherein said first means further comprises a conveyor to convey and drop said product in the direction of said discharge end of said frying body.

6. The frying apparatus of claim 5 in which said conveyor comprises a belt conveyor disposed on a framework and stretched about rolls on a shaft, the upper part of said belt conveyor being adapted to be displaced in the direction of said discharge end of said frying body.

7. The frying apparatus of claim 6 in which said scraper is fixed to said framework and is adapted to be tilted about said shaft turned away from said scraper, by means of at least one fluid operated piston cylinder assembly.

8. The frying apparatus of claim 7 wherein said pulling members are adapted to be displaced in the same directions under all conditions and wherein said frying apparatus comprises means for connecting said pulling members and said first means, said connecting means comprising a slide block and a vertical guide passage, said block being mounted for sliding movement in said vertical guide passage.

9. The frying apparatus of claim 7 comprising means to clean said scraper by wiping at the starting point of the traveling path of said vehicle.

10. The frying apparatus of claim 9 in which said cleaning means comprises a wiper adapted to be tilted to perform a tilting movement and means for tilting the wiper comprising an actuated member disposed in the proximity of said supply end of said frying body.

11. The frying apparatus of claim 1 in which said frying body comprises a hollow box, in the interior of which steam can be passed as heating medium.

* * * * *